United States Patent [19]
Owades

[11] Patent Number: 5,120,557
[45] Date of Patent: Jun. 9, 1992

[54] PREPARATION OF A NON-ALCOHOLIC MALT BEVERAGE

[76] Inventor: Joseph L. Owades, 2164 Hyde St., San Francisco, Calif. 94109

[21] Appl. No.: 718,765

[22] Filed: Jun. 21, 1991

[51] Int. Cl.⁵ .............................................. A23L 2/38
[52] U.S. Cl. ............................... 426/330.3; 426/590; 426/600
[58] Field of Search ................ 426/590, 592, 600, 16, 426/29, 64, 330.3

[56] References Cited

U.S. PATENT DOCUMENTS

| | | | |
|---|---|---|---|
| 4,218,491 | 8/1980 | Laws | 426/600 |
| 4,765,993 | 8/1988 | Owades | 426/64 |
| 4,837,034 | 6/1989 | Owades | 426/29 |
| 4,957,767 | 9/1990 | de Kort | 426/16 |

*Primary Examiner*—Carolyn Paden
*Attorney, Agent, or Firm*—Hayes, Soloway, Hennessey & Hage

[57] ABSTRACT

A method of producing a malt beverage in which wort prepared from malt and ceral adjuncts is boiled in a kettle for a period of time. Thereafter, a quantity of previously extracted (spent) hops is added to the boiling kettle.

12 Claims, No Drawings

PREPARATION OF A NON-ALCOHOLIC MALT BEVERAGE

FIELD OF THE INVENTION

This present invention relates generally to a method for preparing a non-fermented, non-alcoholic nutritious malt-based beverage from cereal grains.

DESCRIPTION OF THE PRIOR ART

Currently, the only unfermented cereal-based beverage produced commercially is a malt-based beverage called "Malta". Malta is a beverage primarily popular amongst the inhabitants of the countries bordering the Caribbean Sea, and descendants thereof. Malta comprises a carbonated alcohol-free beverage made from barley malt, corn, molasses or cane sugar, hops and caramel. Malta is highly flavored and sweetened with molasses or other forms of caramelized sugars and sweetening agents, such as sugar or high-fructose corn syrup. Since Malta needs to be highly sweetened and flavored with burnt sugar, it has not found a market among the vast majority of consumers elsewhere.

Malta conventionally is made by first mashing a mixture of barley malts with warm water, e.g. at about 50° C., in one vessel, the "mash tub"; boiling cereal adjuncts, e.g. corn grits in water in a second vessel, the "cooker", and then adding the boiling contents of the cooker to the warm malt suspension in the mash tub. This serves to raise the temperature of the mash tub contents to about 65° C. where it is held for about half an hour. The temperature of the combined mash is then raised to about 75° C., and the mash pumped to a straining vessel (a Lauter tub or a mash filter). The action of the amylolytic enzymes naturally present in barley malt converts about 65% of the starch in the malt and corn or other cereals to sweet, simple sugars but leaves about 35% in the form of tasteless complex carbohydrates (dextrins). The clear filtrate is then brought to boiling, a quantity of hops added for flavoring, together with caramel for coloring and a sweetening agent such as corn syrup or cane sugar. The resulting boiled liquid is then rapidly cooled to about 0° C., carbonated, filtered, packaged, and pasteurized.

In my prior U.S. Pat. No. 4,765,993, there is described the production of a Malta of typical sweetness and reduced caloric content. As described in my aforesaid patent, there is added to a conventionally processed Malta beverage, following boiling, cooling and filtering, but prior to packaging, an amylolytic enzyme. The amylolytic enzyme system converts the maltose and complex carbohydrates (dextrins) present in the beverage extract to simple, sweet-tasting dextrose. Further, the amylolytic enzyme hydrolyzes the 1,6'-linkage in dextrins still present in the beverage, and produces additional glucose from the debranched molecules. These enzymes also produce two molecules of glucose from one molecule of maltose, thereby further increasing the sweet sugar (glucose) content of the beverage. This in turn permits a reduction in the quantity of sugar employed in the basic Malta formulation, or, in the alternative, reduced quantities of the complex carbohydrate yielding materials, i.e. corn and barley malt, employed in the basic Malta formulation, without loss of flavor or sweetness. This reduction in the quantity of sugar and/or complex carbohydrate yielding materials employed in the basic Malta formulation thus results in a Malta of lower caloric content than a conventionally produced Malta.

The main reason that cereal-based unfermented beverages, as described above, have not been popular, is that they possess a grainy, almost metallic flavor which is not acceptable to most people, and which is not easily masked by delicate flavors or by flavors present in commonly accepted beverages, such as citrus, berry, fruit and the like.

OBJECT OF THE INVENTION

It is thus a primary object of the present invention to overcome the aforesaid disadvantages of the prior art, and to provide a new and improved process of producing a non-fermented, nutritious malt beverage with pleasing qualities of taste and drinkability.

BRIEF DESCRIPTION OF THE INVENTION

The aforesaid and other objects are achieved by the addition of previously extracted or spent hops to a boiling wort. Using previously extracted hops removes from the wort the previously described undesirable flavors, and thus provides a beverage base which may be flavored with common delicate flavors.

DETAILED DESCRIPTION OF THE INVENTION

The wort is prepared in a conventional manner. Typically, a quantity of barley malt is ground, and the ground malt extracted with warm water in known manner, with or without a quantity of other unmalted cereals such as corn or rice. The resulting mash is then strained or filtered in a conventional mash tub or mash filter to remove insoluble components of the cereals. The resulting liquid, or wort, is then boiled in a kettle, for varying periods of several minutes to an hour or more to sterilize the wort and render it safe from microbial spoilage, and a quantity of previously extracted or spent hops, are added to the boiling kettle. A quantity of sugar or high fructose corn syrup may be added at this stage or later. The insoluble portion of the hops are removed by decantation, and the resulting liquid is cooled and filtered. The product may now be acidified, flavored and sweetened to taste. Delicate and commonly acceptable flavors may be used. The resulting beverage contains no malty or grainy taste.

The previously extracted or spent hops used in accordance with the process of the present invention may be solvent-extracted hops employing conventional organic solvents, e.g. hexane, methanol, ethanol, methylene dichloride, etc. or may be extracted by means of liquid or super critical gas extraction techniques, for example, using liquid carbon dioxide or super critical carbon dioxide in known manner. Extracted hops are commercially available from hops extraction processes, and are currently being sold for use as fertilizer. The origin of the hops and the nature of the extraction process appears to have essentially no effect on the process of the present invention or the resulting beverage produced by the present invention. The use of hops which have not been extracted previously would impart bitter notes which are not desirable in delicately flavored beverages.

Depending on the flavor desired, the previously extracted or spent hops preferably is added in an amount in the range of about 0.1 pounds per barrel of wort to 1.0 pounds per barrel of wort. Addition of more than about 1.0 pounds of extracted hops per barrel to the boiling wort appears not to be necessary.

The present invention will be further described in the following working examples:

WORKING EXAMPLES

Example 1

This example illustrates the use of commercially available solvent (hexane)—extracted hops in accordance with the present invention.

100 pounds of barley malt and 1,000 pounds of corn grits were added to 10 barrels of water 130° F. and the resulting mixture was heated to boiling, with stirring, for 15 minutes in a cereal cooker.

Concurrently, 2000 pounds of barley malt is added to 20 barrels of water, and heated to about 130° F., with stirring, in a mash tub. The resulting malt mash is held at 130° F. and the contents of the cereal cooker were then rapidly pumped over and into the mash tub, and stirred. The combined mash, which now has a temperature of about 155° F. is held at that temperature for about 30 minutes and the temperature is raised to 167° F. The mash is filtered or strained, sparged with hot water, and boiled with 10 pounds of spent hops. The decanted liquid is cooled to 33° F., filtered, carbonated and flavored with extracts of raspberries.

Example 2

This example illustrates the use of commercially available liquid carbon-dioxide extracted hops in accordance with the present invention.

The procedure of Example 1 was repeated, but employing the following combination of materials: 5000 pounds of milled rice and 5 pounds of alpha amylase enzyme (available from Enzyme Development Corporation under the name Cookerzyme) were mixed with 50 barrels of water and the temperature was then raised to boiling. In a separate vessel, 3000 pounds of ground barley malt are mixed with 90 barrels of water at 140° F., and the rice mash is added to it. The resulting temperature is about 165° C. The mash is filtered into a kettle and boiled with 60 pounds of spent hops. The decanted liquid is cooled, filtered, carbonated lightly and flavored with apple flavor.

As it appears clearly from the foregoing, the addition of a previously extracted hops, or spent hops provides a new and improved process of producing a non-fermented, nutritious malt beverage with pleasing qualities of taste and drinkability.

Since certain changes may be made in the above process and products without departing from the scope of the invention herein involved, is intended that all matter contained in the above description shall be interpreted in an illustrative and not in a limiting sense.

I claim:

1. In a method of producing a malt beverage, wherein wort prepared from malt and cereal adjuncts is boiled in a kettle for a period of time, the improvement which comprises adding to the boiling kettle a quantity of previously extracted hops.

2. In a method according to claim 1 wherein said hops is selected from the group consisting of a solvent-extracted hops, a liquid gas-extracted hops, and a super critical-gas extracted hops.

3. In a method according to claim 1 wherein said extracted hops is added to said boiling kettle in a range of about 0.1 to about 1.0 pounds of hops per barrel.

4. In a method according to claim 1, and including the steps of cooling and filtering or decanting the kettle boilings.

5. In a method according to claim 4, and including the step of acidifying the resulting filtrate.

6. A malt beverage produced in accordance with the process of claim 5.

7. In a method according to claim 4, and including the steps of flavoring and/or sweetening the resulting filtrate.

8. A malt beverage produced in accordance with the process of claim 7.

9. In a method according to claim 1, wherein the malt and cereal adjuncts are boiled with sugar.

10. A malt beverage produced in accordance with the process of claim 9.

11. A malt beverage produced in accordance with the process of claim 1.

12. A method of removing grainy flavors from a malt beverage, said method which comprises boiling a wort prepared from malt and cereal adjuncts to which is added a quantity of previously extracted hops.

* * * * *